US011606378B1

(12) United States Patent
Delpont et al.

(10) Patent No.: US 11,606,378 B1
(45) Date of Patent: Mar. 14, 2023

(54) LATERAL MOVEMENT DETECTION USING A MIXTURE OF ONLINE ANOMALY SCORING MODELS

(71) Applicant: Rapid7, Inc., Boston, MA (US)

(72) Inventors: Raphaëlle Delpont, San Francisco, CA (US); Gabrielle Rappaport, Paris (FR); Roy Donald Hodgman, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 184 days.

(21) Appl. No.: 17/138,504

(22) Filed: Dec. 30, 2020

(51) Int. Cl.
*H04L 9/40* (2022.01)
*H04L 41/142* (2022.01)
*H04L 43/16* (2022.01)
*G06N 20/00* (2019.01)

(52) U.S. Cl.
CPC ......... *H04L 63/1425* (2013.01); *G06N 20/00* (2019.01); *H04L 41/142* (2013.01); *H04L 43/16* (2013.01); *H04L 63/1433* (2013.01)

(58) Field of Classification Search
None
See application file for complete search history.

(56) References Cited

U.S. PATENT DOCUMENTS

| 7,624,448 | B2 | 11/2009 | Coffman |
| 8,150,783 | B2 | 4/2012 | Gonsalves et al. |
| 8,191,149 | B2 | 5/2012 | Yun et al. |
| 9,202,052 | B1 | 12/2015 | Fang et al. |
| 9,591,006 | B2 | 3/2017 | Siva Kumar et al. |
| 10,476,898 | B2 | 11/2019 | Muddu et al. |
| 2006/0070128 | A1 | 3/2006 | Heimerdinger et al. |
| 2006/0288415 | A1 | 12/2006 | Wong |
| 2009/0099988 | A1 | 4/2009 | Stokes et al. |
| 2011/0167493 | A1 | 7/2011 | Song et al. |

(Continued)

OTHER PUBLICATIONS

Siddharth Bhatia, et al., "MIDAS: Microcluster-Based Detector of Anomalies in Edge Streams", In Proceedings of the AAAI 2020: The Thirty-Fourth AAAI Conference on Artificial Intelligence, New York, NY, USA, Feb. 7-12, 2020, pp. 1-8.

(Continued)

*Primary Examiner* — Cai Y Chen
(74) *Attorney, Agent, or Firm* — Ashwin Anand; Lei Sun

(57) ABSTRACT

Systems and methods are disclosed to implement a cyberattack detection system that monitors a computer network for suspected lateral movement. In embodiments, the system employs multiple machine learning models to analyze connection data of a network to identify anomalies in the network's connection behavior. The models are updated incrementally using online machine learning methods that can be performed in constant time and memory. In embodiments, the system uses an incremental matrix factorization model and a connection count fitting model to generate anomaly scores for each connection. Connection paths are constructed for acyclic sequences of time-ordered connections observed in the stream. The paths are evaluated based on the anomalies scores of their individual connections. Paths that meet a detection criterion are reported to analysts for further review. Because the detection models are online models, they are continuously updated based on newly observed data, without having to store the new observation data.

20 Claims, 10 Drawing Sheets

(56) References Cited

U.S. PATENT DOCUMENTS

| | | |
|---|---|---|
| 2012/0180126 A1 | 7/2012 | Liu et al. |
| 2012/0227108 A1 | 9/2012 | Noel et al. |
| 2016/0219066 A1 | 7/2016 | Vasseur et al. |
| 2016/0253232 A1 | 9/2016 | Puri et al. |
| 2016/0269424 A1 | 9/2016 | Chandola et al. |
| 2016/0330226 A1 | 11/2016 | Chen et al. |
| 2018/0367548 A1* | 12/2018 | Stokes, III .......... H04L 63/1416 |
| 2020/0137104 A1* | 4/2020 | Hassanzadeh ...... H04L 63/1433 |
| 2021/0273958 A1* | 9/2021 | McLean ................. G06N 20/20 |
| 2022/0159025 A1* | 5/2022 | Niv ......................... H04L 67/30 |

OTHER PUBLICATIONS

Albert Bifet, et al., "Learning from Time-Changing Data with Adaptive Windowing", Oct. 17, 2006, In Proceedings ol SIAM International Conference on Data Mining, SDM, pp. 443-448.

Joao Vinagre, et al., "Fast incremental matrix factorization for recommendation with positive-only feedback", In V. Dimitrova, T. Kuflik, D. Chin, F. Ricci, P. Dolog, and G.-J. Houben, editors, UMAP, vol. 8538 of Lecture Notes in Computer Science, Springer, 2014, pp. 459-470.

\* cited by examiner

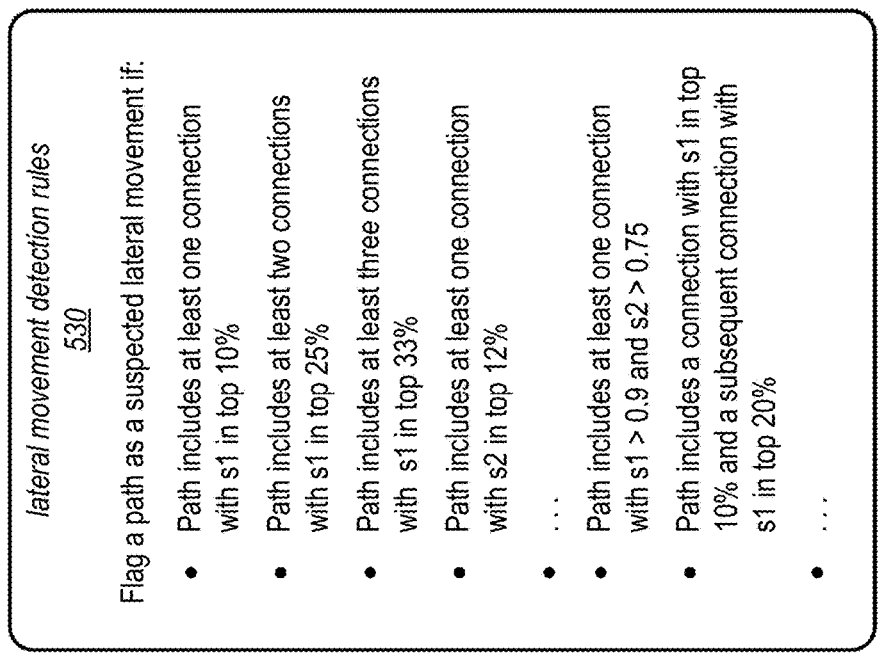
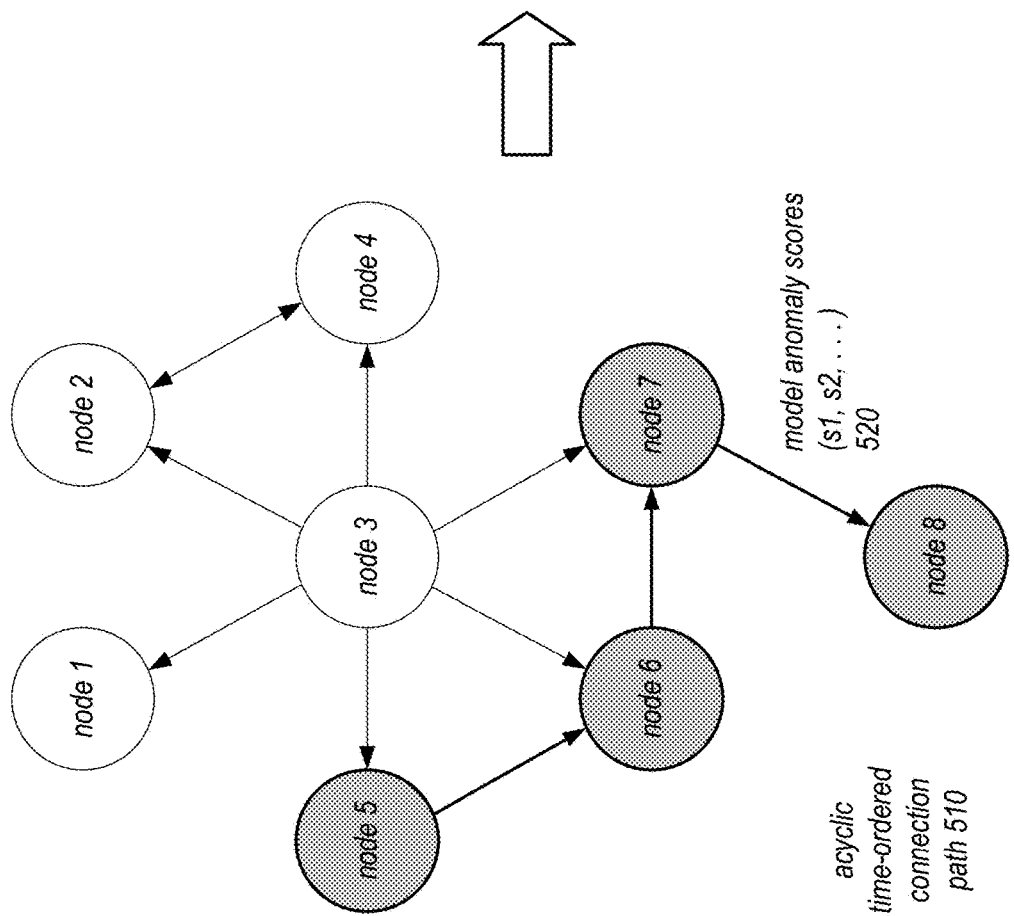
FIG. 5

Suspected Lateral Movement 800

Detected Path Information: 820

Path Time Period:
12/12/2020 from 2:15 AM to 3:55 AM

Protocols Used: RDP, SSH

Lateral Movement Detection Rules Triggered:
One Jump With Anomaly Score X >= 0.90
Three Consecutive Jumps With Anomaly Score Y >= 0.75

PREV  NEXT

Monitored Network 810 selected connection 812

Connection Information: 830

Connection Time: 3:00 AM
Protocols Used: SSH
Anomaly Score X: 0.60
Anomaly Score Y: 0.80
Anomaly Score Z: 0.55

PREV  NEXT

Review Actions: 840

Source Node Activity Log

Dest Node Activity Log

User Activity Log

Open Mitigation Ticket

Whitelist Connection

FIG. 8

LATERAL MOVEMENT DETECTION USING A MIXTURE OF ONLINE ANOMALY SCORING MODELS

BACKGROUND

Lateral movement is a stage of cyberattacks where an attacker progressively moves through an organization's computer network to search for high-value targets. If an attacker's lateral movement can be detected in the network as it is happening, the attack can be stopped before valuable data is exfiltrated or critical resources are compromised. Even after an attack has already taken place, lateral movement detection can still provide valuable information that can be used to limit the damage from the attack or prevent future attacks.

Conventional methods for detecting lateral movement attacks are usually centered around human-based monitoring or mechanical monitoring using hard-coded rules. These monitoring methods can be extremely labor-intensive, time-consuming, and error-prone for large networks. Moreover, conventional monitoring systems are typically designed to watch for known patterns of lateral movement seen in previous attacks, and do not do a good job of identifying new types of attacks. Furthermore, conventional monitoring systems can become increasingly complex and resource-intensive as more observation data and/or detection rules are added to the system. As a result, these systems do not scale well over time. Improved systems for lateral movement detection are needed to address these and other challenges in the state of the art.

SUMMARY OF EMBODIMENTS

The systems and methods described herein may be employed in various combinations and embodiments to implement a cyberattack detection system that monitors a computer network for lateral movement. In some embodiments, the system employs multiple online machine learning models to analyze a stream of connection data collected from a monitored network to identify anomalies in the network's connection behavior. The machine learning models are updated incrementally for new observations using the online machine learning methods, so that detections can be performed in constant time and memory without storing the observation data. In some embodiments, the system uses an incremental matrix factorization model that maintains two factor matrices for source node and destination node features that can be used to obtain a connection likelihood metric between individual source nodes and destination nodes. In some embodiments, the system uses a connection count fitting model that counts different types of connections over successive time periods and watches for a statistically significant change in the connection count in the most recent period. Different anomaly scores are generated by the models for each connection in the connection stream. In some embodiments, connection paths are periodically generated for acyclic sequences of time-ordered connections observed in the stream. The paths are evaluated based on the anomalies scores of their individual connections. Paths that meet a lateral movement detection criterion are reported to security analysts for further review.

BRIEF DESCRIPTION OF THE DRAWINGS

FIG. 5 illustrates an example connection path generated by the cyberattack detection system and example lateral movement detection rules that can be applied to the path, according to some embodiments.

FIG. 8 illustrates an example graphical user interface of the cyberattack detection system that provides information about a suspected lateral movement in a computer network, according to some embodiments.

Figure 1:
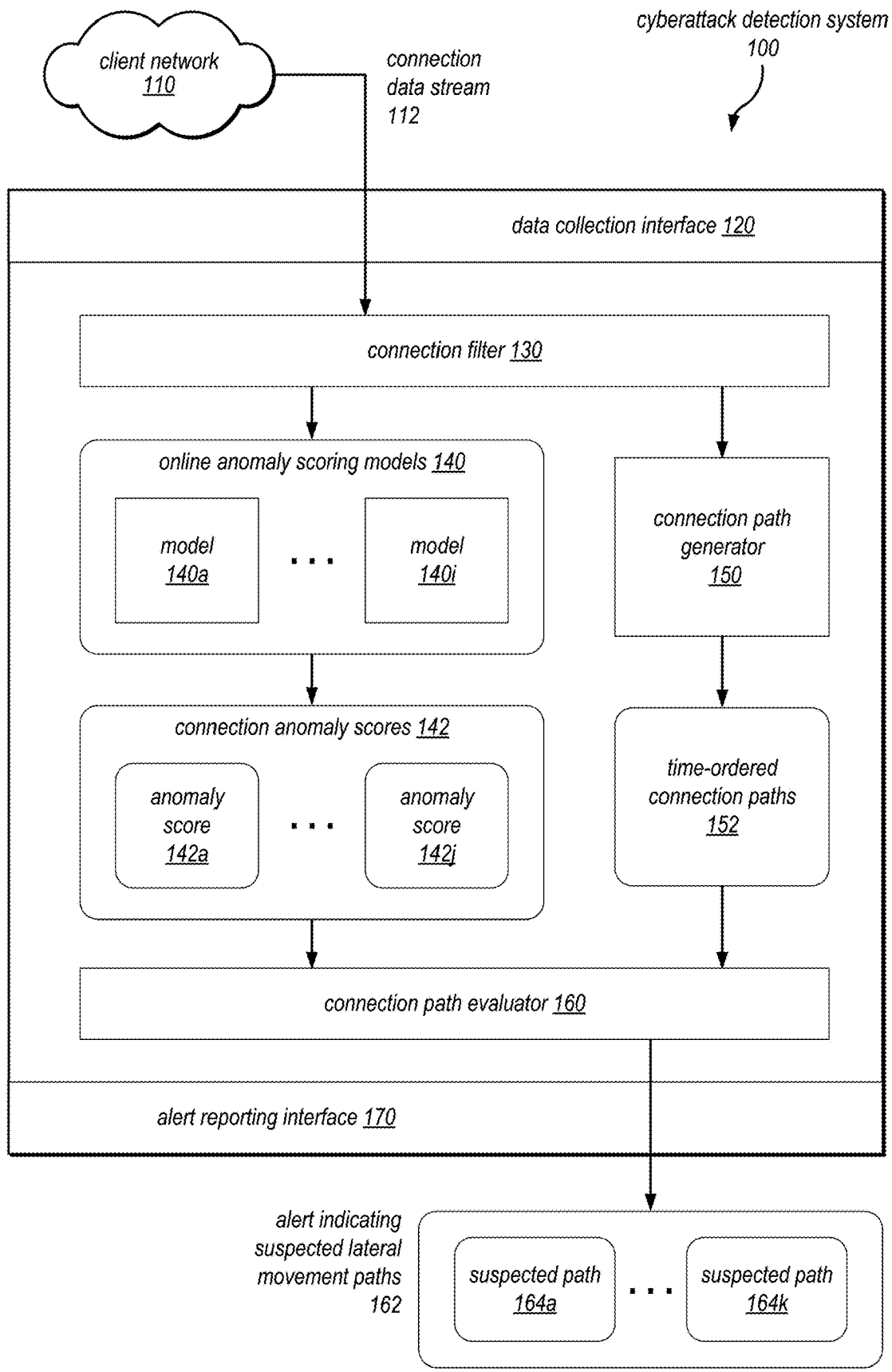
FIG. 1 is a block diagram illustrating an example cyberattack detection system that uses multiple online anomaly scoring models to detect suspected lateral movements in a computer network, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Lateral movement is a stage of cyberattacks where an attacker progressively moves through an organization's computer network to search for high-value targets. If an attacker's lateral movement in the network can be detected as it is happening, the attack can be stopped before valuable data is exfiltrated or critical resources are compromised. Even after an attack has already taken place, lateral movement detection can still provide valuable information that can be used to limit the damage caused by the attack and/or prevent future attacks.

Conventional methods for detecting lateral movement attacks are usually centered around human-based monitoring and/or mechanical monitoring using hard-coded rules.

Depending on the size of the network, these monitoring methods can be extremely labor-intensive, time-consuming, and error-prone. Moreover, conventional monitoring systems are designed to watch for known patterns of lateral movement seen in previous attacks. These systems do not do a good job of identifying new types of attacks that use unconventional movements within the network. Furthermore, conventional monitoring systems can become increasingly complex and resource-intensive as more observation data and/or detection rules are added to the system. As a result, these systems do not scale well over time.

To address these and other problems in the state of the art, embodiments of a cyberattack detection system are disclosed herein. In some embodiments, the cyberattack detection system monitors a computer network by collecting a stream of data describing connections between computing devices within the network. Examples of such connection data are discussed in U.S. patent application Ser. No. 16/931,923, titled "Graph-Based Detection of Lateral Movement in Computer Networks," filed Jul. 17, 2020, which is hereby incorporated by reference in its entirety. In some embodiments, the cyberattack detection system uses machine learning models to examine the connection data and flag anomalous behavior (e.g. lateral movements) in the monitored network. In some embodiments, detected anomalies in the connection data may be reported to a network administrator or security analyst, who will review the anomalies and possibly take mitigation actions on the actual attacks.

In some embodiments, the cyberattack detection system will filter the connection stream to remove certain types of connections from the lateral movement detection process. For example, the system may remove connections made by known network scanners, which are configured to programmatically connect to many nodes in the network to carry out benign activities such as health monitoring or data collection. These types of scanner connections tend to skew the results of the lateral movement detection process, so they are removed by the connection filters. As another example, connections may be filtered based on their connection protocols, so that the detection process is limited to a small set of protocols.

The machine learning models used by the cyberattack detection system will generate different types of anomaly scores for individual observed connections. These models may be implemented as online models that are trained incrementally as new observation data arrives. In some embodiments, the models may be updated for each new connection, at the same time when the anomaly score is determined for the connection. The training or updating of the models is performed in constant time and using constant memory. In some embodiments, the incremental updates do not store the new observation data for future decision making, so that the storage requirements of the detection system remain constant over time.

In some embodiments, the cyberattack detection system may employ an incremental matrix factorization (IMF) model. In some embodiments, the IMF model makes predictions about the likelihood of connections between individual source and destination nodes of the network. The more likely the connection is according to the model, the less anomalous it is. In some embodiments, the model maintains two factor matrices for features of all source and destination nodes in the network. The likelihood value may be obtained by multiplying desired vectors in the source node feature matrix and the destination node feature matrix. The incremental matrix factorization algorithm updates the two factor matrices to reflect the connection propensities of the nodes in the network over time. In some embodiments, the two factor matrices may be updated using a stochastic gradient descent process. In some embodiments, the anomaly scores associated with the source nodes are modified by a penalty function so that if a source node is not well-known to the model (e.g. the source node does not have sufficient observation history), the anomaly scores associated with the source node will be attenuated. In this manner, connections from newer source nodes are less likely to be reported as anomalies.

In some embodiments, the cyberattack detection system may employ a connection count fitting (CCF) model. In some embodiments, the CCF model estimates a mean level for the count of a type of connection over time (e.g. connections between a particular pair of nodes) using count structures that are updated online based on new connections. When the observed count for the type of connection in a new time period increases or decreases significantly as compared to the mean, the change will cause a high anomaly score to be generated by the model. In some embodiments, the model may store the counts in approximate count structures (e.g. count-min sketch structures), so that the memory requirements of the model are bounded regardless of the number of nodes in the network. In some embodiments, a chi squared statistic is computed to indicate the goodness of fit of a particular count given its historical mean. In some embodiments, the CCF model may be adapted to detect anomalous behavior in clusters of nodes in the network, or suddenly arriving groups of suspiciously similar connections. For example, in some embodiments, the count for connections between source node u and destination node v may be augmented by a fraction of connections made by source node u to other destination nodes in the same period. As another example, the count for connections between nodes u and v may be augmented by a fraction of connections between the two nodes in a previous period. In some embodiments, the augmentation of the counts may be accomplished by retaining a fraction of counts a count structure for a current time period, based on a decaying factor. In this manner, the model is able to effectively link the counts of similar types of connections in the network. In some embodiments, the CCF model may determine multiple types of the counts for a particular connection (u, v) (e.g., counts of connections from u to v, counts of connections initiated by u, counts of connections directed to v). The anomaly score for the connection may be determined by aggregating the goodness-of-fit statistics for the multiple types of connection counts.

In some embodiments, the cyberattack detection system is able to achieve particularly good results when the IMF model is combined with the CCF model. The improved results are attributable to the fact that the two models are designed to watch for very different signals in the connection data. For example, whereas the IMF model is designed to examine each connection individually, the CCF model is focused on groups of similar connections over time. In empirical studies, when the two models were used together, the system was able to discover a wider array of lateral movements in test networks than when either model was used alone.

In some embodiments, the cyberattack detection system will periodically generate a set of connection paths to be evaluated as potential lateral movement paths. In a typical lateral movement, an attacker first connects to one node in the network, and uses that node to connect to another node in the network, and so on. To mimic such movement, each generated connection path will be a sequence of time-ordered connections from one node to another in the network. In some embodiments, the path generation process may assume that an attacker will not retrace his steps, so that the generated paths are acyclic. It is noted that even if an attacker retraces his steps in a lateral movement path, the path will still be flagged by the system if the length of the paths evaluated by the system are sufficiently small. In some embodiments, path generation may be constrained to limit the generated path to a particular length or time span.

In some embodiments, each generated path is evaluated based on the anomaly scores of its constituent connections. In some embodiments, the evaluation may be performed based on a set of lateral movement detection rules or criteria. A detection rule may specify that a path should be flagged as a suspected lateral movement path if the path's anomaly scores exceed some combination of score quantiles. For example, for a path of length n, a detection rule may require that all n connections must have an anomaly score above a quantile $q_n$, at least n-1 of the connections must be above a quantile $q_{n-1}$, etc. In some embodiments, the quantiles of the rule may be dynamically changed online based on incoming observations (e.g. new connection scores). In some embodiments, the evaluation may be performed using other machine learning models (e.g. LSTM or boosted classifiers), which may be trained to identify potential lateral movement paths based on the paths' anomaly scores and/or other features of the paths. In some embodiments, these path evaluation models may also be online models that are updated incrementally based on new observation data. In some embodiments, suspected lateral movement paths are reported to security analysts for further investigation, or forwarded to downstream systems for more rigorous analysis or initiation of closer monitoring.

In some embodiments, the cyberattack detection system may implement an online drift detection system that monitors the network for large-scale connection behavior changes. For example, during the recent pandemic, the networks of many companies experienced significant changes in their daily connection patterns. These changes triggered a spike of false alerts from the cyberattack detection system. To prevent such spikes, embodiments of the online drift detection system may detect one or more drift conditions in the network, and in response, make automatic adjustments to the operations of the system. For example, in some embodiments, detection of a drift may cause the system to ignore certain types of anomalous connections for a period of time in order to give the models an opportunity to adapt to the changed behaviors. As another example, the system may react to a drift by increasing the training or learning rate of the models, so that the models can learn the changed behaviors more quickly.

As will be appreciated by those skilled in the art, the disclosed features of the cyberattack detection system provide numerous technical improvements to enhance the functioning of existing attack monitoring systems in the state of the art. These and other features and benefits of the lateral movement detection system are described in further detail below, in connection with the figures.

FIG. 1 is a block diagram illustrating an example cyberattack detection system that uses multiple online anomaly scoring models to detect suspected lateral movements in a computer network, according to some embodiments.

As shown, the figure depicts a cyberattack attack system 100 that is configured to monitor a client network 110 for signs of lateral movement. In some embodiments, the cyberattack attack system may collect a connection data stream 112 from the client network 110 via a data collection interface 120. The connection data may be collected at network data collection points (e.g. networking switches or routers) in the client network, so that the network nodes themselves are not adversely impacted. In some embodiments, the data collection interface 120 may be a service interface (e.g. an API) that allows the data collection agents to upload data to the cyberattack detection system. The lateral movement detection process implemented by the cyberattack detection system 100 may be an ongoing process that continuously monitors the client network for possible signs of lateral movement based on the connection data stream.

In some embodiments, the connection data 112 may indicate network connections that were established or attempted among nodes of the client network. The connection data 112 may also include metadata about each connection, such as the time of the connection, the source and destination nodes of the connection, the type or category of machines used as the source and destination nodes, the user(s) at the source and destination nodes involved in making the connection, the source and destination ports used by the connection, among other information. In some embodiments, the system 100 may also receive connection data for connections that were made from or to nodes external to the client network 110. In that case, the connection data may also include information such as the geolocation organization information associated with the public IP address of the external node.

As shown, embodiments of the cyberattack detection system may implement a connection filter 130 to filter the stream of connection data 112, so that certain connections will be excluded from the lateral movement detection process. For example, in some embodiments, only connections using particular types of connection protocols (e.g., RDP, SMB, WinRM, SSH, etc.) will be analyzed for lateral movement. In some embodiments, connections made by known network scanners (e.g. nodes that are configured to attempt connections to a large number of other nodes) are also excluded. Scanner nodes may account for a large proportion of connections in the network, and their presence may bias the machine learning models 140 in unintended ways. In some embodiments, a connection may be filtered out because it was whitelisted or designated as an uninteresting connection by human analysts. However, it is noted that extensive whitelisting of connections should be discouraged, because lateral movement paths may often be composed of successive normal connections.

As shown, the filtered connection data is then analyzed by a set of anomaly scoring models 140. These models 140a-i may be machine learning models of different types, which are trained based on the connection data to produce a set of anomaly score 142a-j for each connection. In some embodiments, the models are trained in an unsupervised manner (e.g. without use of truth labeled data). In some embodiments, the models are trained using online machine learning techniques, where the model is updated incrementally as new observation data is received. Thus, the online anomaly scoring models 140 are updated continuously based on the incoming data to reflect the most up-to-date knowledge about the connection behavior of the client network. In some embodiments, the online machine learning techniques may be performed for each connection in constant time and using constant memory. Moreover, in some embodiments, the online machine learning techniques do not accumulate newly received observation data in persistent storage, so that the model does not require increasing amounts of storage space over time.

In some embodiments, the anomaly scoring models 140 may include an incremental matrix factorization (IMF) model that maintains two factor matrices for features of the source and destination nodes in the network. These factor matrices can be used to determine a connection likelihood metric between individual source and destination nodes, which can be used to derive an anomaly score for an observed connection. In some embodiments, the IMF model is implemented as a positive-only feedback model that predicts the presence of a new connection between two nodes. In some embodiments, the anomaly scoring models 140 may include a connection count fitting (CCF) model that counts different types of connections over successive time periods and watches for a statistically significant deviation in the connection count in the current period. The CCF model may generate an anomaly score based on the statistical significance of the deviation. In some embodiments, the anomaly scoring models 140 may include both an IMF mode and a CCF model to generate at least two different anomaly scores for each connection. The combination of these two types of anomaly scores yielded particularly good detection results in embodiments of the system.

As shown, in some embodiments, the cyberattack detection system 100 may implement a connection path generator component 150, which is used to generate a set of timed-ordered connection paths 152 observed in the connection data stream 112. These generated paths will be evaluated as potential lateral movement paths of a possible attack occurring within the network. In some embodiments, the generated paths may be acyclic, so that no node in the path is visited more than once. In some embodiments, the path generator 150 will generate all possible time-ordered connection paths from the connection data stream within a given time period. In some embodiments, each link or jump in the connection path may be annotated with additional metadata attributes, such as connection properties discussed previously or the connection anomaly scores 142 generated by the anomaly scoring models 140. Additional examples of the time-ordered connection paths 152 are described in U.S. patent application Ser. No. 16/931,923.

As shown, the cyberattack detection system 100 may implement a connection path evaluator component 160. Once the time-ordered connection paths 152 are generated with anomaly scores 142 for their respective connections, the paths are evaluated by the path evaluator 160 to determine whether each individual path represents a suspicious lateral movement. In some embodiments, the evaluation may be made based on configurable lateral movement detection rules or criteria. For example, in some embodiments, a particular lateral movement detection criterion may check whether the path includes one or more connections having an anomaly score 142 above a certain threshold, which may be a quantile of the score over an observation period. The quantile thresholds may be updated in an online manner as new paths are observed and analyzed by the anomaly scoring models. In some embodiments, the detection rules may also take into account other attributes of the path, such as types of machines involved in the path, the user(s) who initiated in the connections, the amount or type of data that were transmitted over the connections, the timing of the connections, etc. In some embodiments, the connection path evaluator 160 may also be implemented using one or more machine learning models. For example, in some embodiments, the evaluator 160 may be implemented using an LSTM or boosted classification model. In some embodiments, these path evaluator models may also be trained incrementally using online machine learning techniques.

When a lateral movement is detected in the connection data, embodiments of the cyberattack detection system will generate an alert via an alert reporting interface 170. In some embodiments, the alert reporting interface 170 may be a user interface that is configured to report various findings of the detection system 100 to security analysts or network administrators, including alerts 162 indicating suspected lateral movement paths 164*a-k* within the client network. In some embodiments, the alert reporting interface 170 may be a graphical user interface (GUI), such as a web-based interface that can be displayed using a web browser. In some embodiments, the alert reporting interface 170 may be a notification interface that pushes alerts or notifications to registered user accounts. For example, registered users of the system may be able to receive alerts or notifications from the system via email, text, or some other data push mechanism. In some embodiments, the alert reporting interface 170 may log generated alerts 162 to a log file or some other type of data repository. In this manner, the disclosed cyberattack detection system 100 will continuously monitor the connections in the client network and report any suspicious connections occurring within the network. Embodiments of the disclosed system may be fully self-managing, and require little or no human involvement to carry out the ongoing monitoring of the client network. Moreover, the machine learning models used by the system are continuously learning the connection behavior of the client network, so that the detection system can constantly adapt to the client network. The cyberattack detection system is able to operate indefinitely without requiring substantial human reprogramming or additional computing resources.

Figure 2:
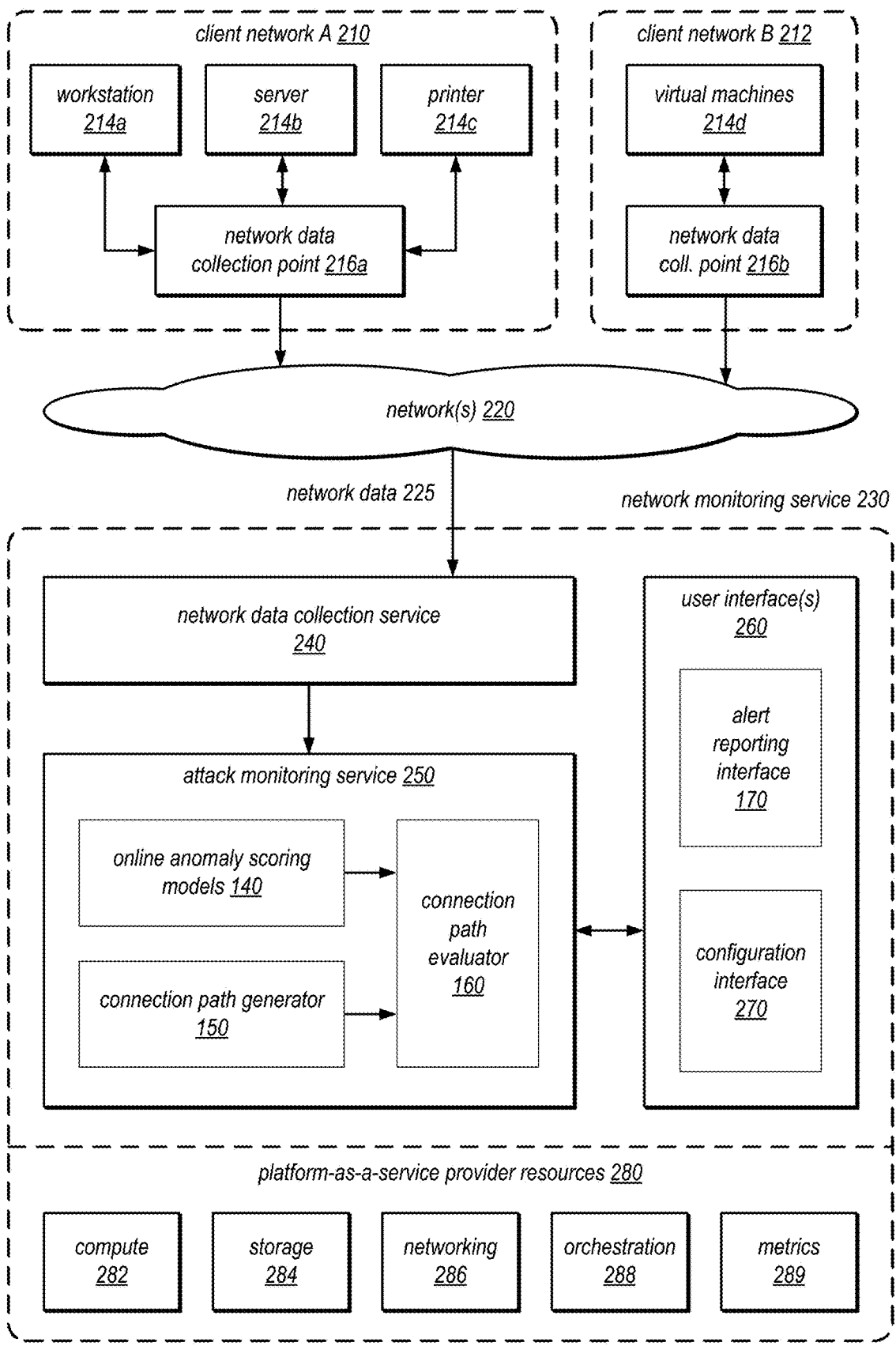
FIG. 2 is a block diagram illustrating an attack monitoring service that is implemented on a platform-as-a-service provider network, according to some embodiments.

FIG. 2 is a block diagram illustrating an attack monitoring service that is implemented on a platform-as-a-service provider network, according to some embodiments.

As shown in the figure, a network data collection service 240 and an attack monitoring service 250 are implemented as part a network monitoring service 230. In some embodiments, the network data collection service 240 may be configured to implement the data collection interface 120 of FIG. 1, and the attack monitoring service 250 may be configured to implement the cyberattack detection system 100 of FIG. 1. The network monitoring service 230 is configured to monitor the remote client networks 210 and 212, which may be embodiments of the client network 110 of FIG. 1. The client networks may be operated by different companies, organizations, groups, or other types of entities that are customers of the network monitoring service 230. In some embodiments, the network monitoring service may monitor the client networks for various types of conditions, including conditions regarding network configuration, security compliance, operational state and performance, and potential cyberattacks.

In various embodiments, the network(s) 220 may encompass any suitable combination of networking hardware and protocols necessary to establish communications between the client networks 210 and 212 and the network monitoring service 230. In some embodiments, the machines 214*a-c* may execute in the private network of a company, behind a company firewall. The network 220 may be a public network such as the Internet, which lies outside the firewall. In some embodiments, the network 220 may also include private networks such as private local area networks (LANs), private wide area networks (WANs), or private wireless networks. The network 220 may be implemented using different hardware (e.g., modems, routers, switches, load balancers, proxy servers, etc.) and software (e.g., protocol stack software, routing software, firewall/security software, etc.) for establishing networking links between the client networks 210 and 212 and the network monitoring service 230.

As shown, the client networks 210 and 212 include different types of nodes, such as a workstation 214a, a server 214b, a printer 214c, and a virtual machine 214d. The virtual machine 214d may be an instance of an emulated computer that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtualized execution environment is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, machines 214a-d may include a variety of other types of computing systems, including embedded systems, networking devices, storage devices, Internet-of-Things (IoT) devices, vehicles, and the like.

As shown, each client network may implement one or more network data collection points 216, which are configured to collect network data 225 from the client networks, such as the connection data stream 112 of FIG. 1. In some embodiments, these network data collection points 216 are distinct from the nodes 214a-d themselves, and may be implemented as a separate network entity, device, or host in the client network. For example, in some embodiments, a network data collection point may be implemented on a networking device such as a switch or a router in the client network. In some embodiments, a networking device configured as a network data collection point may implement a mirror port that sends a copy of the network traffic passing through the networking device (and/or associated network metadata) to a remote listener such as the network data collection service 240. In some embodiments where the node is a virtual machine, the network data collection point may be implemented by the hypervisor running on the virtualization host. In some embodiments, a network data collection point may be implemented using a separate data collection host that is connected to the networking device(s) of the client network. In this manner, collection of the network data will not impact the nodes 214a-d of the client networks.

As shown, once the network data 225 is received by the network data collection service 240, the data is provided to the attack monitoring service 250. The attack monitoring service 250 may implement the functionality to detect lateral movements within the client networks 210 and 212, as discussed in connection with FIG. 1. For example, the attack monitoring service 250 may implement the online anomaly scoring models 140, the connection path generator 150, and the connection path evaluator 160, as discussed in connection with FIG. 1. In some embodiments, each client network 210 and 212 may be monitored using a distinct set of anomaly scoring models 140, connection path generators 150, and/or connection path evaluators 160. In some embodiments, each of these components may be implemented in a distributed fashion using a pool of compute nodes.

As shown, the network monitoring service 230 may also implement a user interface 260, which may be a web-based graphical user interface. In this example, the user interface 260 provides the alert reporting interface 170 of FIG. 1, as well as a configuration interface 270 for the network monitoring service 230. In some embodiments, the configuration interface 270 may allow network administrators to configure various operational parameters of the attack monitoring service 250.

As shown, the network monitoring service 230 in this example is implemented on a platform-as-a-service provider network. In some embodiments, the network monitoring service 230 may be configured as a number of web services that receive web services requests formatted as JSON documents. The network monitoring service 230 may support REST-style or document-based (e.g., SOAP-based) types of web services requests. In some embodiments, the network monitoring service 230 may implement service interfaces using other types of remote procedure calling protocols, such as GOOGLE PROTOCOL BUFFERS or PROTOBUF. Moreover, the PaaS provider network may provide the necessary hardware and/or software to implement service endpoints, so that a request directed to the service is properly received and routed by the endpoints.

As shown, the PaaS provider network may provide different types of computing resources 280, which can be leased by service customers to implement custom hosted services. As shown, the PaaS provider may provide resource services such as compute resource service 282, storage resource service 284, networking resources service 286, orchestration service 288, and resource metrics service 289. The services of the network monitoring service 230 may be built using these underlying resource services provided by the PaaS provider. In some embodiments, the PaaS resources 280 may implement features such as load balancing of incoming service requests and/or dynamic management and scaling of service node pools. In some embodiments, each of the services 240, 250, and 260 may be implemented using compute nodes provided by the PaaS provider, which may be individual instances of virtual machines. In some embodiments, the PaaS provider may be a provider such as AMAZON WEB SERVICES or MICROSOFT AZURE.

Figure 3:
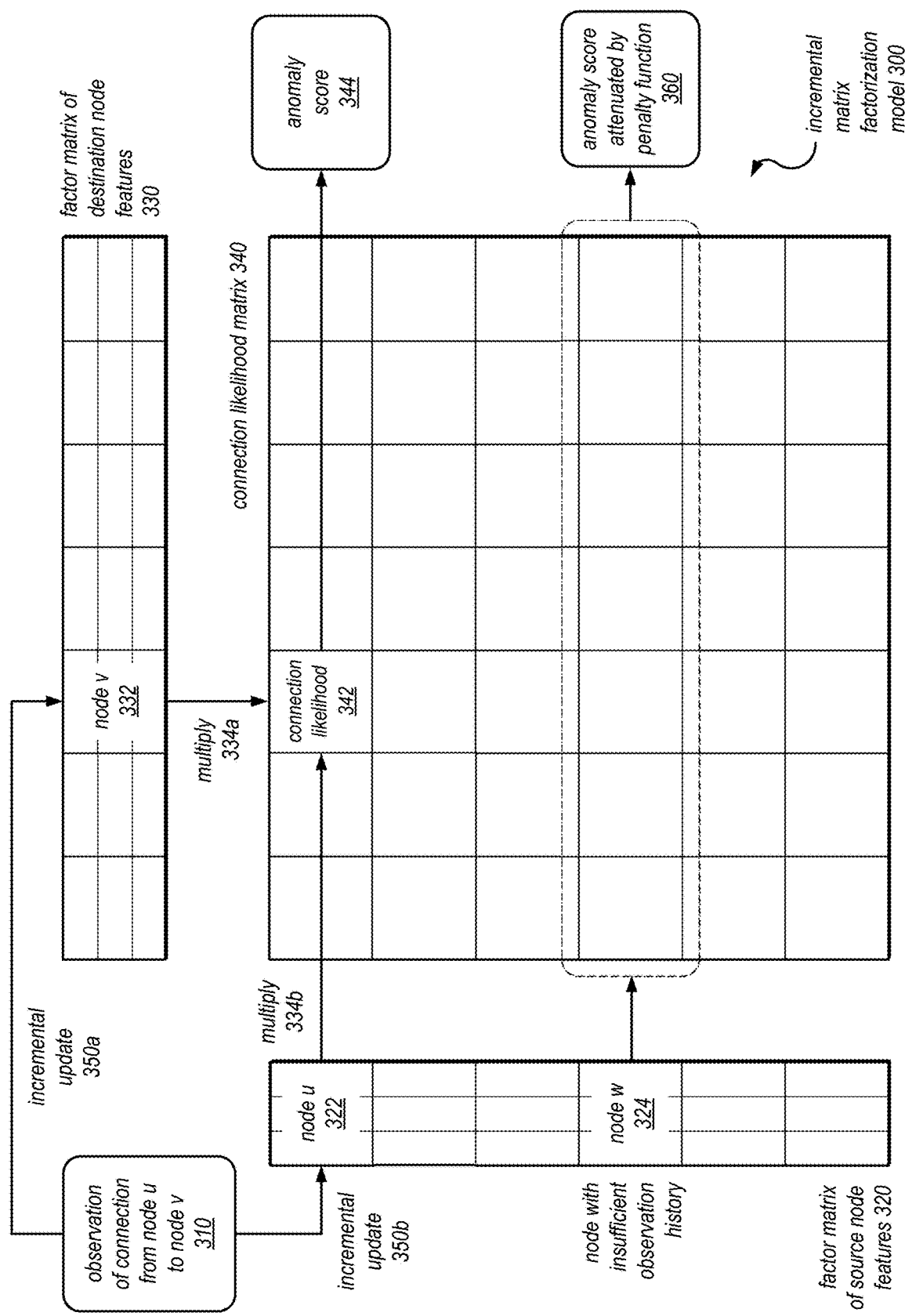
FIG. 3 illustrates an incremental matrix factorization model that can be used in a cyberattack detection system to detect suspected lateral movements, according to some embodiments.

FIG. 3 illustrates an incremental matrix factorization model 300 that can be used in a cyberattack detection system to detect suspected lateral movements, according to some embodiments. The IMF model 300 illustrated in the figure may be an anomaly scoring model 140 of FIG. 1.

In some embodiments of the matrix factorization model, a likelihood matrix R (here the connection likelihood matrix 340) is constructed based on two factor matrices A and B covering a common feature space (here factor matrices 320 and 330). The common features space represents the features of the nodes. The features space may be of dimension k, where the value k is a parameter of the model that can be tuned. The likelihood matrix R may indicate the propensities of individual source nodes connecting to individual destination nodes in the network. In some embodiments, the cell values of the factor matrices A and B may correspond to actual characteristics of the nodes, which are learned based on available observations. In some embodiments, only the two factor matrices 320 and 330 are maintained in memory. When the model is called upon to determine an anomaly score for an observed connection 310 from node u to node v, corresponding vectors for source node u 322 and destination node v 332 in the two factor matrices are multiplied 334 to obtain the dot product $\hat{R}_{uv} = A_u \cdot B_v^T$. The value $\hat{R}_{uv}$ may indicate a connection likelihood metric 342 for connections from node u to node v. This connection likelihood metric 342 may be used to compute the anomaly score 344 of the observed connection 310. In some embodiments, the anomaly score 344 may be inversely proportional to the connection likelihood 342 (the less likely the connection, the higher the anomaly score).

As discussed, in some embodiments, the incremental matrix factorization model 300 is an online model that is updated using an online machine learning technique. As shown in this example, when a newly observed connection 310 (i.e. a positive feedback) is received, the corresponding vectors 322 and 332 in the two factor matrices 320 and 330 are incrementally updated 350. In some embodiments, this incremental update 350 may be performed for each positive feedback and without any negative feedback (i.e. observations of absence of connections between two nodes). In some embodiments, the incremental update 350 may be performed using stochastic gradient descent adapted for positive-only feedback, and aims to minimize the function $\Sigma_{(u,v)} 1-\hat{R}_{uv}$ for individual nodes u and v in the factor matrices.

Table I below illustrates the pseudocode for one example implementation of the incremental update 350. As shown, the incremental update 350 may be performed in a single pass over the available data, using stochastic gradient descent (lines 11-13). The value η represents a learning rate of the model that controls how quickly the model learns based on new observations. The λ parameter is a regularization parameter that is used to control the complexity of the model and avoid overfitting. In some embodiments, these parameters may be dynamically configurable. As shown in lines 5 to 10, the algorithm allows for new source and destination nodes to be added to the model. The matrix cell values for new source or destination nodes may be initialized to random values between 0 and 1. In some embodiments, the initial values for the nodes may be obtained using singular value decomposition (SVD). For example, the matrix R may first be approximated using a first batch of connection data, and this approximate matrix may be decomposed into the initial factor matrices A and B. After this initial step, the factor matrices A and B may be updated online based on new observed connections.

TABLE I

Incremental Update Algorithm for
Matrix Factorization Model

| | |
|---|---|
| 1: | data stream: D = {< u, v >} |
| 2: | input: feat, λ, η |
| 3: | output: A, B |
| 4: | for < u, v > ∈ D do |
| 5: |    if u ∉ Rows(A) then |
| 6: |       $A_u$ ← Vector(size: feat) |
| 7: |       $A_u$ ~ N(0, 0.1) |
| 8: |    if v ∉ Rows($B^T$) then |
| 9: |       $B_v^T$ ← Vector(size: feat) |
| 10: |       $B_v^T$ ~ N(0, 0.1) |
| 11: |    $err_{uv}$ ← 1 − $A_u \cdot B_v^T$ |
| 12: |    $A_u$ ← $A_u$ + η($err_{uv}B_v^T$ − λ$A_u$) |
| 13: |    $B_v$ ← $B_v$ + η($err_{uv}A_u$ − λ$B_v^T$) |

Turning back to the figure, in some embodiments, the model 300 may penalize source nodes (e.g. node w 324) that have insufficient observation history. This may occur if a source node is a new machine in the network that has not been sufficiently observed by the model. Embodiments of the model may apply a penalty function 360 to all source nodes to attenuate or reduce the anomaly scores of the source nodes based on how much observation history they have. As a result of the penalizations, connections from source nodes with short observation histories (e.g. node w 324) are less likely to be flagged as anomalous connections. In some embodiments, the penalty function 360 may take into account the number of times that the node was seen as a source node in the connection data. In some embodiments, the following example penalty function may be used:

$$score_{final} = \alpha * score_{MF}\left(\frac{1}{q} - \frac{t}{count}\right)$$

In the function, $score_{final}$ is the score outputted by the penalty function for the connection. $score_{MF}$ is the anomaly score obtained based on the factor matrices. count is the number of observations of the source node of the connection. α is a scaling coefficient chosen for the dataset (e.g. the particular network) that controls the range of values outputted by the function. The parameter t is a coefficient that controls the range of action of the attenuation, where a higher value of t means that the anomaly score will be attenuated until a higher count is reached. Thus, the model is deemed to have sufficient knowledge about a source node after the threshold count, as controlled by the value t. Finally, the parameter q is another scaling coefficient that controls which range of values are the most impacted. In some embodiments, these parameters of the penalty function may be configurable via a configuration interface of the system or automatically tuned. In some embodiments, the system may allow users to specify other types of penalty functions for attenuating the anomaly score.

Figure 4:
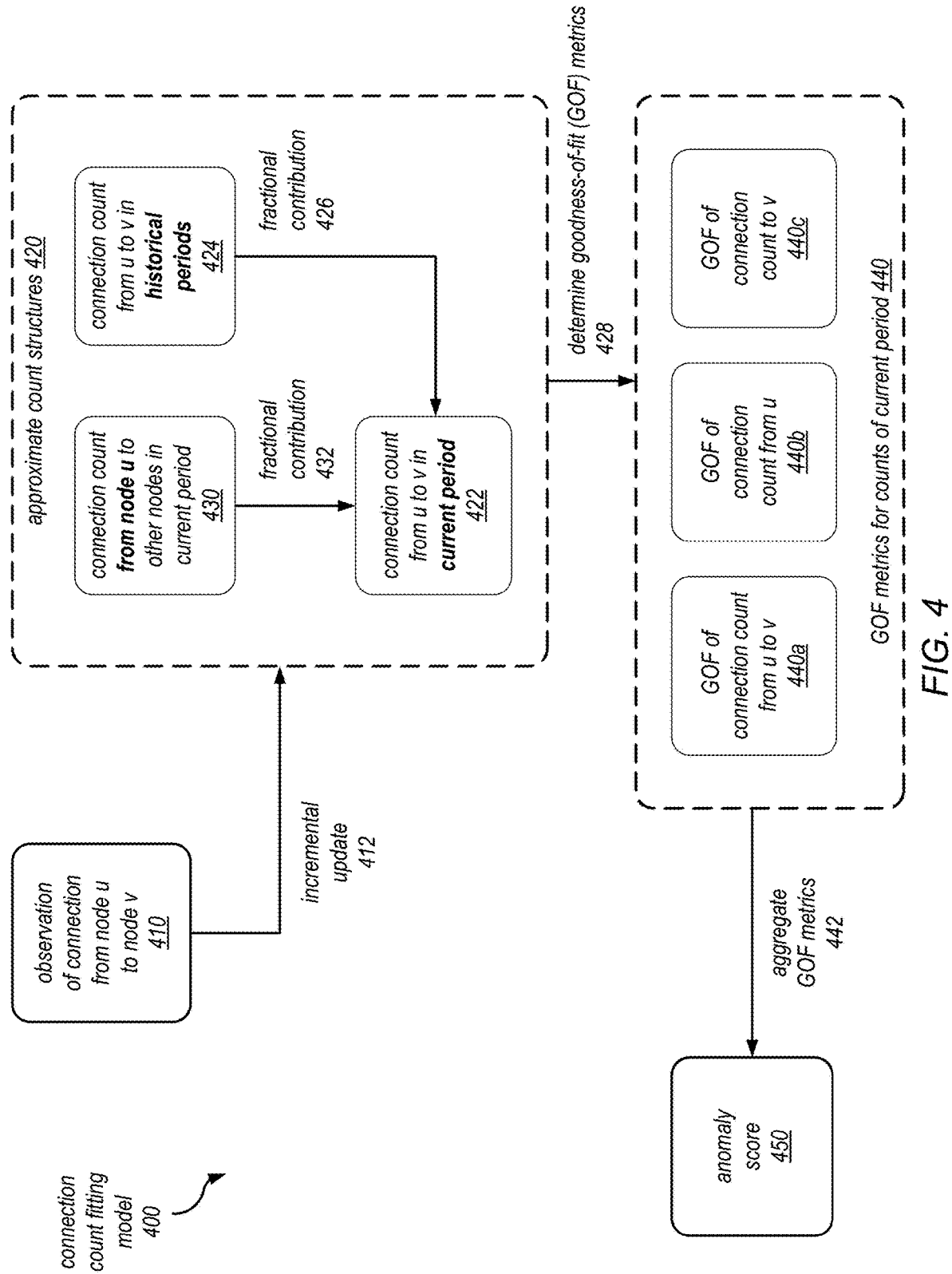
FIG. 4 illustrates a connection count fitting model that can be used in a cyberattack detection system to detect suspected lateral movements, according to some embodiments.

FIG. 4 illustrates a connection count fitting model that can be used in a cyberattack detection system to detect suspected lateral movements, according to some embodiments. The CCF model 400 illustrated in the figure may be an anomaly scoring model 140 of FIG. 1.

In embodiments of the connection count fitting model, the model monitors the counts of different types of connections (e.g. connections between distinct pairs of source and destination nodes) over successive time periods. In some embodiments, the CCF model may assume a mean level of the count (e.g. the average rate at which connections appear) over previous time periods. If the connection count in a new time period deviates drastically from the mean, instances of that type of connection in a new period will be deemed anomalous.

In some embodiments, the connection counts are tracked using a number of approximate count structures 420 such as count-min sketches. These structures may be used to store estimates of the counts using constant time and memory while providing guarantees on the probability of error. As shown, when a new observed connection 410 from node u to node v is received, the new connection is used to incrementally update 412 the approximate count structures 420. In some embodiments, for each type of connection (here connections from u to v), a first approximate count 422 is maintained for the connections in a current period, and a second approximate count 424 is maintained for the connections in historical time periods, possibly including the current period. In some embodiments, the CCF model may maintain exact counts for the different connection types, for example, when the number of nodes in the network is small.

As shown, to determine the anomaly score 450 of the connection 410, a number of goodness-of-fit metrics 440 are determined 428 based on the two counts 422 and 424. These goodness-of-fit metrics 440 may indicate how well the count value in the current period "fits" with historical values of the count in previous periods. In some embodiments, the goodness-of-fit metrics 440 may be chi-squared statistics. For example, the chi-squared statistic $x^2$ for connections from node u to node v in time period t may be determined using the formula below.

$$\chi^2(u, v, t) = \left(\hat{a}_{uv} - \frac{\hat{s}_{uv}}{t}\right)^2 \frac{t^2}{\hat{s}_{uv}(t-1)}$$

In the formula, the $\hat{a}_{uv}$ is the approximate count of u-to-v connections in the current time period (e.g. count 422), $\hat{s}_{uv}$ is the approximate count of u-to-v connections in all time periods including the current period (e.g. count 424), and t is the number of time periods.

As shown, in some embodiments, multiple goodness-of-fit metrics 440a-c may be determined for the current time period. In this example, goodness-of-fit metrics are determined for counts of connections from u to v, counts of connections initiated by u, and counts of connections directed to v. These metrics are then aggregated 442 using an aggregation function to determine the final anomaly score 450 for the connection 410. Depending on the embodiment, the CCF model may use different types of goodness-of-fit metrics as those shown here. For example, in some embodiments, the model may not use metric 440c for the count of connections directed to v, as this metric may be less relevant for detection of malicious lateral movement.

Depending on the embodiment, different types of aggregation functions may be used to aggregate or combine the goodness-of-fit metrics 440. In some embodiments, the maximum of the metrics 440a-c may be used to determine the anomaly score. In some embodiments, an average of the metrics 440 may be used.

In some embodiments, the CCF model may link certain types of connection counts, so that connections that are spatially or temporally related may influence the connection counts of one another. This linking may be accomplished by adding some fraction of the count of one type of connection to the count of another type of connection. As shown in this example, the count for connections from u to v in the current period is augmented by a fraction 432 of connections from node u to other nodes in the current period. Additionally, the count for connections from u to v in the current period is augmented by a fraction 426 of connections from u to v in one or more previous periods. In some embodiments, the augmentation of the count may be accomplished by retaining a fraction of the count 422 during a period transition, so that the current period count is not reset to zero at the end of the current period. In some embodiments, the retained fraction may be controlled by a decaying factor of the model, which determines how much weight the model attributes to the counts of previous periods during its anomaly determinations. The linking of the counts in this manner allows the model maintain some awareness as to the relationship between groups of similar connections in the network. With this knowledge, the model is able to detect anomalies such as a sudden appearance of a large number of connections in the cluster of related nodes. Table II below provides the pseudocode for one example implementation of the CCF model.

TABLE II

Scoring and Update Algorithm for Connection Count Fitting Model

| | |
|---|---|
| 1: | input: stream of connections over time |
| 2: | output: anomaly scores for each connection |
| 3: | initialize CMS data structures for: |
| 4: | total count $s_{uv}$ and current count $a_{uv}$ |
| 5: | total count $s_u$ and current count $a_u$ |
| 6: | total count $s_v$ and current count $a_v$ |
| 7: | while new connection (u, v, t) is received do |
| 8: | update CMS data structures for new connection |
| 9: | retrieve updated counts for $\hat{s}_{uv}$, $\hat{a}_{uv}$, $\hat{s}_u$, $\hat{s}_v$, $\hat{a}_u$, and $\hat{a}_v$ |
| 10: | compute chi-squared statistics for $\chi^2(u, v, t)$, $\chi^2(u, t)$, and $\chi^2(v, t)$ |
| 11: | aggregate the three chi-squared statistics and output the resulting anomaly score |

As shown in lines 3-6 of the pseudocode above, embodiments of the CCF model may maintain multiple count-min sketch structures for different types of connections (here the counts of connections between each pair of source and destination nodes, connections from each source node, and connections to each destination node). For each newly observed connection, the count-min sketches are updated at line 8. As discussed, this updating may involve augmenting the counts with fractions of counts of other types of connections. At line 9, the CMS structures are queried to determine the approximate counts needed to compute the three chi-squared statistics, which occurs at lines 10. Finally, at line 11, the three chi-squared statistics are aggregated to produce the anomaly score for the connection, which is outputted.

Depending on the embodiment, different types of configuration adjustments or changes may be made to the CCF model. For example, in some embodiments, the size of the time periods may be adjustable. In one empirical study performed on a test network, an observation period length of one minute produced the best detection results. In some embodiments, the decaying factor that controls the linking of counts may be configurable. If the decaying factor is too small, the advantages of temporal smoothing will be diminished. However, if the decaying factor is too large, small anomalies in the current period will go unnoticed. As a final example, in some embodiments, the aggregation function for combining the goodness-of-fit metrics may be configurable. In one empirical study, an aggregation function that generated a logarithm of the sum of the metrics produced the best results.

FIG. 5 illustrates an example connection path generated by the cyberattack detection system and example lateral movement detection rules that can be applied to the path, according to some embodiments. The illustrated connection path 510 may be one of the connection paths 152 of FIG. 1.

As shown, the figure depicts a connection graph of eight nodes that made connections to each other during an observation period. As shown, the generated connection path 510 is a path of three sequential connections, from node 5 to node 8. The connection path 510 may represent a possible attack path taken during a lateral movement in the network, where an attacker progressively jumps from one node to the next to explore the network. In some embodiments, the path generation process may be limited to generate only acyclic paths where no node is visited more than once in the path. In some embodiments, generated paths may be constrained by configuration parameters, such as a maximum time period for the path, a maximum time lag between successive connections, a common user across the sequence of connections, etc. In some embodiments, the connection paths may be generated on a periodic basis from the connection data stream (e.g. once an hour), and will include all possible paths of a certain length that satisfy the path generation constraints.

As shown, in some embodiments, each connection in the path is annotated with connection metadata attributes, which may include the model-generated anomaly scores 520. As discussed, each anomaly scoring model may provide a different anomaly score for the connection. In some embodiments, the connection metadata may include other properties of the connection, including observed properties such as the connection time, the connection protocol, the machine type of the source and destination nodes, etc.

As shown, each generated path may be evaluated based on a set of lateral movement detection rules 530. The detection rules 530 may be implemented by an embodiment of the connection path evaluator 160 of FIG. 1. In some embodiments, the rules may specify a quantile of an anomaly score as a detection threshold. For example, the detection rules 530 include rules indicating detection thresholds of 10%, 25%, and 33% quantiles for the anomaly score sl. In some embodiments, some of the rules may specify absolute values for detection thresholds as opposed to quantile values. In some embodiments, as shown in the rules 530, some of the detection rules may include detection criteria involving multiple anomaly scores. In some embodiments, the detection rules may also specify other detection conditions that are based on the observed properties of the path and its connections. In some embodiments, these thresholds may be configurable or automatically tuned by the system over time to control the number of alerts that are generated. In some embodiments, the system may use a customized performance metric to measure the performance of the connection path evaluator. Typically, a model's performance is measured using metrics such as false positive/true positive/false negative/true negative rates. In this context, however, these metrics are not as useful because the identified paths may include some malicious connections and some benign connections, so that an individual path is not necessarily a "positive or a "negative." Moreover, some paths may be flagged by the system based on a common sequence of connections, so that they are reflective of a single decision by the system manifested in multiple alerts. To address these issues, in some embodiments, a modified F1 score was used (F1$_{bis}$), as defined by the following formula:

$$F1_{bis} = \frac{tp}{tp + \frac{1}{2}(fp - fpaa + fn)}$$

In the formula, the values tp, ƒp, and ƒn are the true positive, false positive, and false negative rates for the generated alerts, and the identified paths themselves. The identified paths are collapsed into equivalence classes based on the number of connections they have in common. These classes are then used to determine the true positive, false positive, and false negative rates. The value ƒpaa is a "false positive almost alert" rate, which indicates the proportion of positive alerts that were counted as false positive because they included connections that were linked to an attack. These alerts would not have been generated without the attack path. In the F1$_{bis}$ score, the ƒpaa value is not treated as part of the tp because they are not true attack paths. However, the ƒpaa value is also excluded from the ƒp as a penalization of the system.

In some embodiments, instead of using a set of detection rules to evaluate connection paths, the path evaluator may use one or more machine learning models to perform the evaluation. For example, a classification model such as a LSTM neural network may be used in some embodiments. LSTMs are a type of recurrent neural network trained to process sequential input data (here the connection data in the path). LSTM models include memory elements that provide context as the sequence of input data is processed. In some embodiments, the LSTM model is trained using labeled paths that are indicative of actual lateral movements. Connections in the training data may first be scored using the anomaly scoring models and then used to train the LSTM model. In other embodiments, other types of machine learning models such as an XGBoost model may be used as the path evaluation model.

In some embodiments, the connection path evaluator may identify groups of suspicious lateral movement paths that are very close to each other. For example, in some cases, the evaluator may flag several connection paths that differ only in the last connection. In order not to generate too many redundant alerts for these paths, in some embodiments, the model evaluator may group the flagged paths into equivalence classes and generate a single alert for the entire class. In some embodiments, an equivalence class may be defined to include all paths that differ by only one connection. In some embodiments, the definition of equivalence classes may be configurable.

Figure 6:
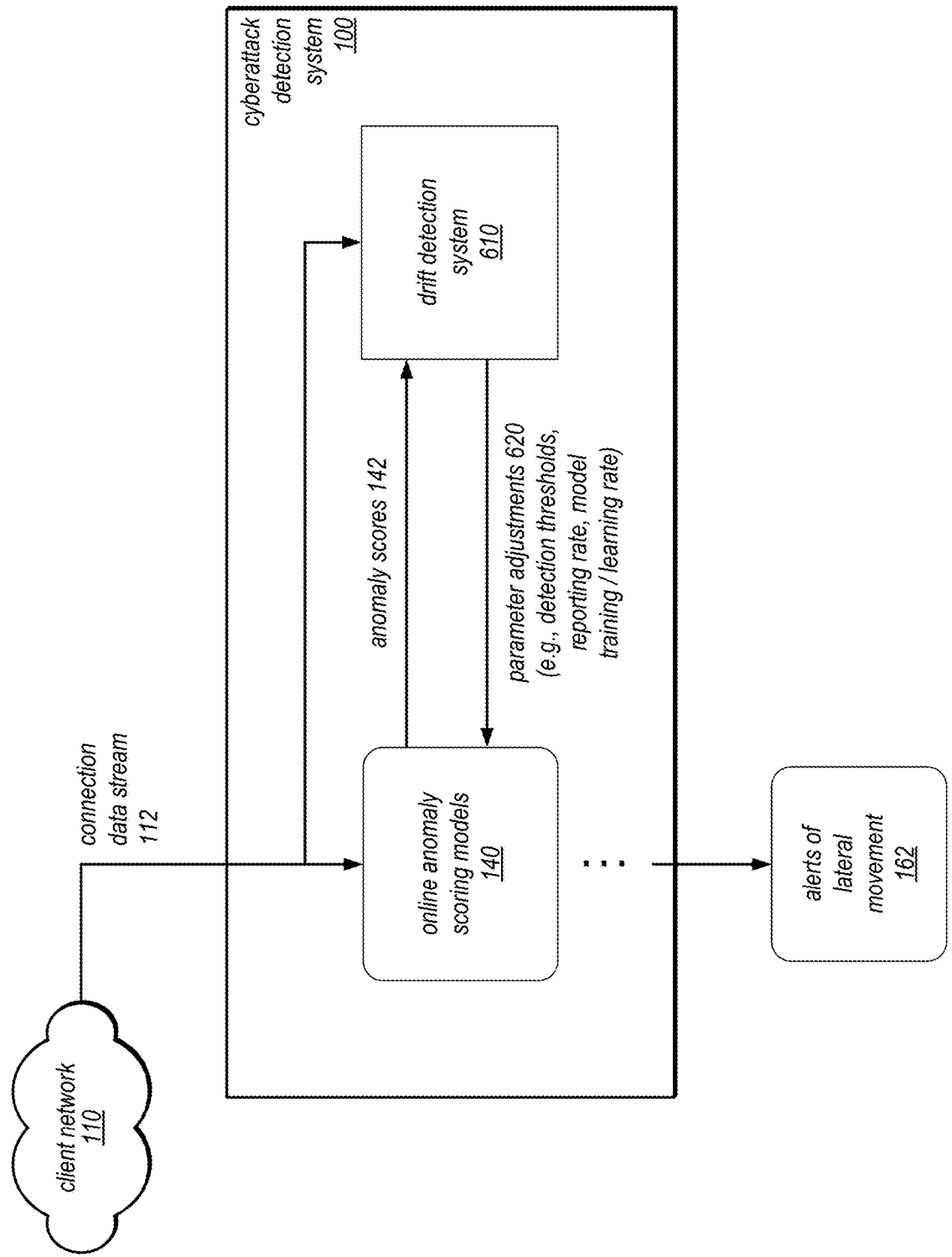
FIG. 6 illustrates a drift detection system that can be used in a cyberattack detection system to make system parameter adjustments based on detected drifts in the connection data, according to some embodiments.

FIG. 6 illustrates a drift detection system that can be used in a cyberattack detection system to make system parameter adjustments based on detected drifts in the connection data, according to some embodiments.

Occasionally, a client network 110 may undergo structural changes in its connection behavior in response to particular events. For example, during the recent pandemic, many users of company networks switched to working from home, which changed the way they connected to the networks. As a result of these sudden changes, the anomaly scoring models 140 may overwhelm the system with a spike of anomalous connections. In order to better cope with these events, in some embodiments, the cyberattack detection system 100 will implement a drift detection system 610 that is configured to detect specified drift conditions in the network (e.g. significant shifts in the connection behavior of the network as a whole). The drift detection system may make automatic system parameter changes 620 in response to detected drift conditions. Like the anomaly scoring models 140, embodiments of the drift detection system 610 may be implemented using an online machine learning model or algorithm that is updated incrementally based on newly received observation data.

As shown, in some embodiments, the input data to the drift detection system 610 may include the connection data stream 112. In some embodiments, the input data may also include the connection anomaly scores 142 generated by the anomaly scoring models 140. The drift detection system may monitor various extracted parameters of the input data over time to determine if a drift condition has occurred in the network. For example, embodiments of the drift detection system 610 may track parameters such as the number of external connections made to the network, the overall number of connections made within the network, the sudden appearance or disappearance of a large numbers of nodes or users, the overall proportions of anomalous connections detected by the models, among other types of metrics. In some embodiments, the drift detection system 610 may employ an adaptive windowing algorithm to track a rolling window of these metrics. The adaptive windows may be used to watch for structural changes in the network as a whole, or changes in one or more particular machines in the network. Table III below provides the pseudocode for an example adaptive windowing algorithm.

TABLE III

Adaptive Windowing Algorithm

1: initialize window W
2: for each t > 0
3:     do W ← W ∪ {$x_t$} (i.e. add $x_t$ to the head of W)
4:     repeat drop elements from the tail of W
5:         until $|\hat{\mu}_{W_0} - \hat{\mu}_{W_1}| \geq \epsilon_{cut}$ holds
6:             for every split of W into W = $W_0 \cdot W_1$
7: output $\hat{\mu}_W$ As shown, the above algorithm automatically keeps a sliding window for time series data x, detects when a change occurs in the time series data, and adjusts the window to forget an older portion of the data. In operation, the sliding window may grow longer when no change is apparent, and shrink when the data changes. As shown, the algorithm repeatedly checks whether two sufficiently large sub-windows of W ($W_0$ and $W_1$) exhibit sufficiently distinct averages ($\hat{\mu}_{w0}$ and $\hat{\mu}_{w1}$) based on a threshold $\epsilon_{cut}$. If so, the older portion of the window $W_0$ is dropped. The remaining portion of the window $W_1$ may then be used as the new detection threshold for the drift detection system. The above algorithm can be performed online based on new values $x_t$.

As shown, if a drift condition is detected, the drift detection system 610 may perform one or more system parameter adjustments 620. For example, in some embodiments, the drift detection system 610 may increase the detection thresholds of the anomaly scoring models 140, so that fewer alerts of lateral movement paths are generated. In some embodiments, the drift detection system may decrease the reporting rate of the system, so that alerts of suspected lateral movement paths are reported less frequently. In some embodiments, the system may temporarily stop generating alerts for a period of time to provide the models 140 more time to learn the new connection behavior of the network. In some embodiments, a detected drift may trigger an increase in the models' training or learning rate, so that they can learn more quickly about the network's new connection behavior.

Figure 7:
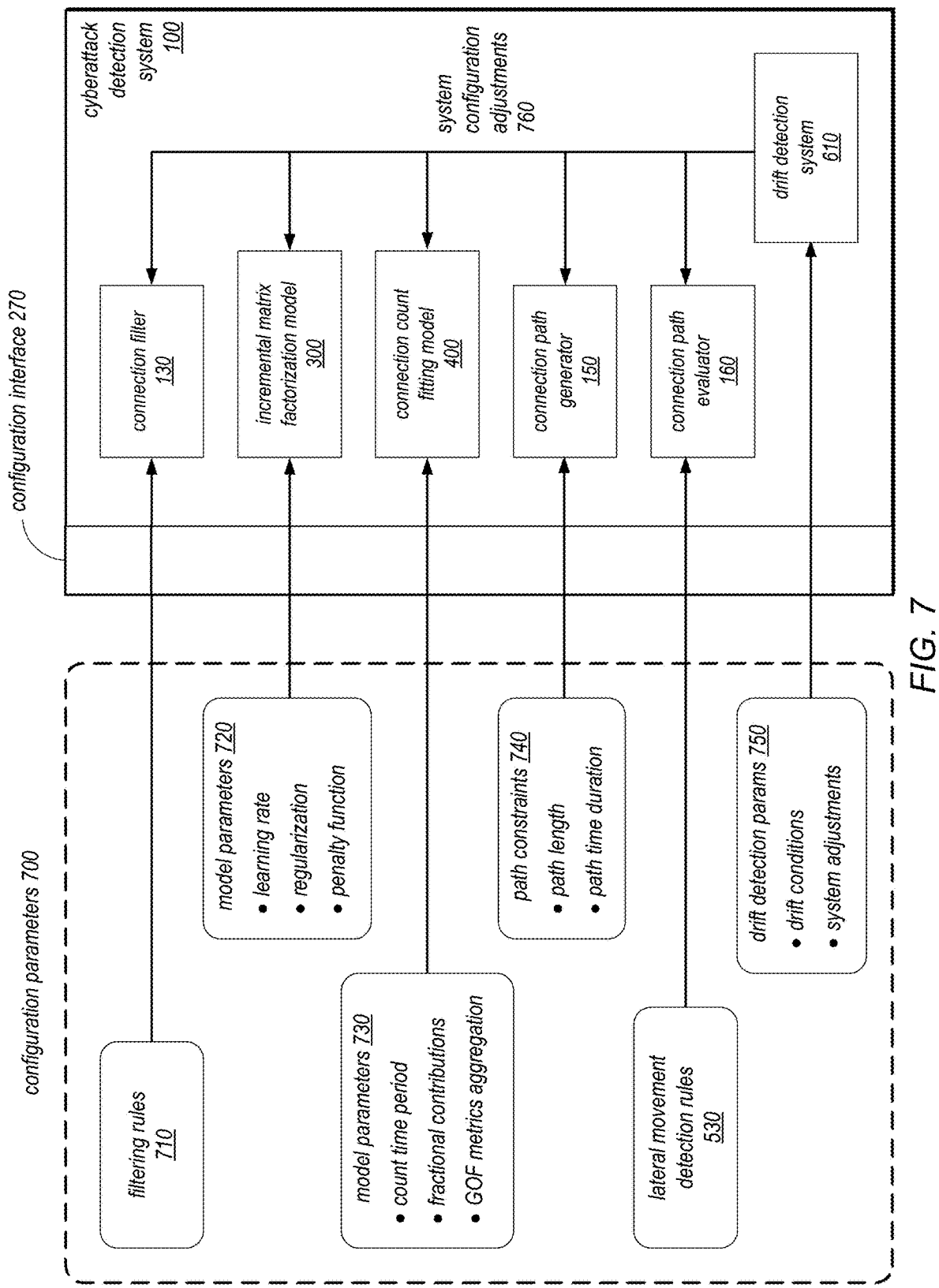
FIG. 7 illustrates various configuration parameters that can be used to configure the operations of a cyberattack detection system, according to some embodiments.

FIG. 7 illustrates various configuration parameters that can be used to configure the operations of a cyberattack detection system, according to some embodiments. As shown, the configuration data 700 may be specified via the configuration interface 270, as discussed in connection with FIG. 2.

As shown, in some embodiments, the connection filter component 130 of the cyberattack detection system 100 may be configured with filtering rules 710. The filtering rules may be used to exclude certain types of connections in the connection data stream from being used to generate suspicious lateral movement paths. For example, the filtering rules may exclude connections of certain types of connection protocols, connections from certain source nodes, connections initiated by certain users, etc. In some embodiments, certain categories of trusted connections may be whitelisted by the filtering rules so that they are never used for lateral movement detection.

As shown, in some embodiments, an incremental matrix factorization model 300 used by the cyberattack detection system 100 may be configured based on a set of model parameters 720. For example, the model parameters 720 may specify a learning rate of the model, a regularization parameter of the model, and/or the penalty function of the model used to attenuate the anomaly scores associated with newer source nodes, among other types of model parameters.

As shown, in some embodiments, a connection count fitting model 400 used by the cyberattack detection system 100 may be configured based on another set of model parameters 730. For example, the model parameters 730 may specify the length of the time periods for the connection counts, the fractional contributions between the counts of different connection types (e.g. a decaying factor used to retain connection counts from previous periods), and/or the aggregation function used to combine the goodness-of-fit metrics computed by the model, among other types of model parameters.

As shown, in some embodiments, the connection path generator 150 of the cyberattack detection system 100 may be configured to operate according to a set of path generation constraints 740. Accordingly, all paths generated by the connection path generator will be generated subject to these constraints. For example, the path constraints 740 may specify that all generated paths must be a particular path length, occur within a particular time duration (e.g. one day), or include connections associated with the same user, etc.

As shown, in some embodiments, the connection path evaluator 160 of the cyberattack detection system 100 may be configured with lateral movement detection rules 530, as discussed in connection with FIG. 5. As discussed, a set of suspicious lateral movement paths will be identified using these rules 530 from the paths generated by the connection path generator. In some embodiments, the detection rules may specify lateral movement detection criteria based on connection anomaly scores generated the anomaly scoring models. In some embodiments, the detection criteria may also include conditions of other observed properties of the paths or connections in the paths (e.g. the time when the connection path occurred, the type of machines involved in the paths, etc.). In some embodiments, the lateral movement detection rules may assign a path suspicion score for each connection path. The paths are then ranked, and a specified number of the highest-ranking paths are reported.

As shown, in some embodiments, the drift detection system 610 may be configured based on a set of drift detection parameters 750. In some embodiments, the drift detection parameters 750 may specify the types of drift conditions that the drift detection system will detect. For example, the drift detection system may be configured to monitor for changes in the overall number of connections in the network, the number of new nodes or users in the network, the amount of incoming or outgoing data in the network, etc., as signals of structural changes in the network. In some embodiments, the monitoring may be performed using an adaptive windowing algorithm, and the drift detection parameters 750 may indicate parameters of the algorithm. Additionally, in some embodiments, the drift detection parameters 750 may also specify different types of system adjustments or actions 760 that will be performed in response to different types of detected drift conditions. For example, depending on the drift condition, the cyberattack detection system may be reconfigured to raise the alert reporting threshold(s), reduce the reporting frequency, increase the models' training or learning rates, among other types of adjustments. In some embodiments, the drift detection system 610 may be used to dynamically update the configuration parameters 700 of the other system components, as discussed previously.

FIG. 8 illustrates an example graphical user interface of the cyberattack detection system that provides information about a suspected lateral movement in a computer network, according to some embodiments. The graphical user interface 800 may be used as an alert reporting interface 170, as discussed in connection with FIG. 1.

As shown, GUI 800 displays a suspected lateral movement path that is detected by the cyberattack detection system. In this example, the monitored network 810 is displayed graphically, and the nodes and connections involved in suspected lateral movement path is shown within the graphical depiction of network 810.

As shown, the GUI includes a detected path information section 820, which provides a number of informational items about the detected lateral movement path. In this example, the path information includes the time period of the path time period, the protocols used for the connections in the paths, and the lateral movement detection rules that were triggered by the path.

In this example, the GUI allows users to select individual connections within the displayed connection path in order to view detailed information about the connections. In this example, a particular connection 812 is selected, and information about that connection is provided in section 830. As shown, section 830 in this example displays the different model-generated anomaly scores for the selected connection.

As shown, the GUI also includes a review actions section 840, which provides a number of control elements to allow the user to perform a variety of actions when reviewing the reported lateral movement. In this example, the user may click on the buttons to review additional information about the connection, such as the activity logs of the source and destination nodes, and the activity log of the user associated with the connection. These control elements will allow a user to thoroughly examine various types of data associated with the reported lateral movement to determine if an attack has truly occurred.

If the suspected lateral movement is verified, the user may choose to initiate certain mitigation actions against the attack by opening a mitigation ticket. On the other hand, if a review of the relevant data indicates that the alert does not indicate a true attack, the user may choose to whitelist certain connections or the entire connection path to resolve the alert. In some embodiments, whitelisted connections may be added to a library so that future observations of the same type of connection will be ignored by the cyberattack detection system.

Figure 9:
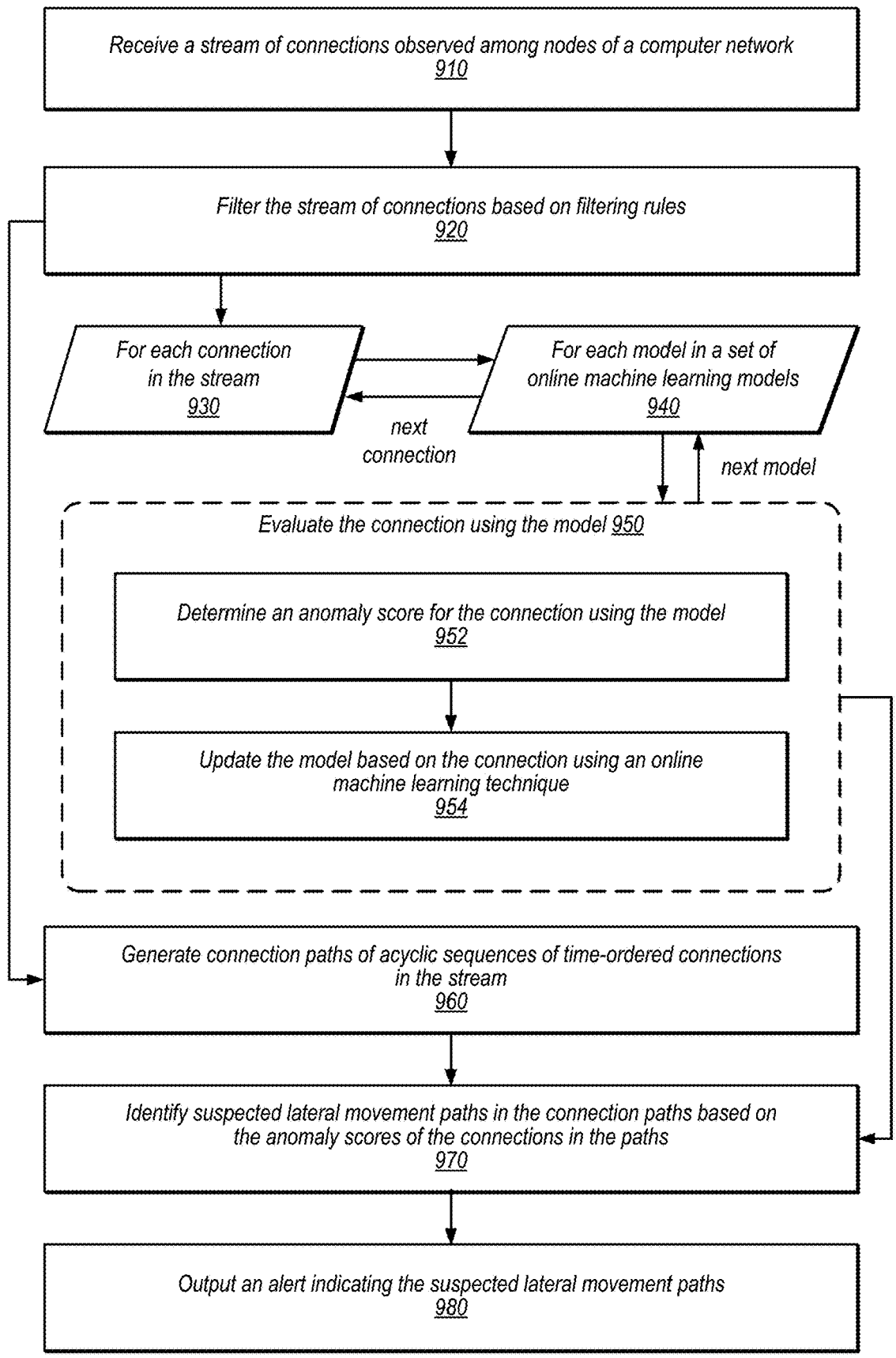
FIG. 9 is a flowchart illustrating a process performed by a cyberattack detection system to detect a lateral movement in a computer network, according to some embodiments.

FIG. 9 is a flowchart illustrating a process performed by a cyberattack detection system to detect a lateral movement in a computer network, according to some embodiments. The depicted process may be performed by an embodiment of the cyberattack detection system 100 of FIG. 1.

The process begins at operation 910, where a stream of observed connections among nodes of a computer network is received. In some embodiments, the connection stream (e.g. connection stream 122 of FIG. 1) may include metadata about data traffic between nodes of the network, such as connection times, the connection protocol used, the source and destination nodes, etc. In some embodiments, the connection stream may be generated by network data collection points in the network, such as collection points 216 of FIG. 2.

At operation 920, the connection stream is filtered based on a set of filtering rules. Operation 920 may be performed by an embodiment of the connection filter 130 of FIG. 1, which is configured to remove certain types of connection from the lateral movement detection process. For example, the filtering may exclude connections of particular protocols, from particular source nodes, during particular times, etc. In some embodiments, specific categories of connections may be whitelisted so that they will not be used to generate suspicious lateral movement paths.

As shown, operations 930 and 940 implement a nested loop, where each connection in the stream is analyzed by individual ones of a set of online machine learning models (e.g. the anomaly scoring models 140 of FIG. 1). As part of each evaluation 950, at operation 952, an anomaly score is determined for the connection using an anomaly scoring model. These scores may be used to annotate the connections in connection paths generated from the stream, as discussed in operation 960. At operation 954, the anomaly scoring model is updated based on the connection using an online machine learning technique. Accordingly, the anomaly scoring models are updated incrementally for individual observations of connections. The updating may be performed in an online manner, using constant time and memory, and without storing the observation for the model's future decisions.

In some embodiments, the anomaly scoring models may include an incremental matrix factorization model (e.g. model 300 of FIG. 3). The IMF model maintains two factor matrices for features of individual source and destination nodes in the network. The factor matrices may be multiplied to produce a likelihood matrix that indicates the likelihoods of connections between individual source and destination nodes. In some embodiments, the updating of the IMF model may be performed for each observed connection using stochastic gradient descent. In some embodiments, newly observed source and destination nodes are dynamically added to the factor matrices. However, in some embodiments, connections from source nodes with insufficient observation history may be given less weight (e.g. by attenuating the anomaly score with a penalty function). In this way, connections from these source nodes are less likely to be included in detected lateral movement paths.

In some embodiments, the anomaly scoring models may include a connection count fitting model (e.g. model 400 of FIG. 4). The CCF model may maintain a number of approximate count structures (e.g. count-min sketches) to count connections of different types over time (e.g. connections between distinct pairs of source and destination nodes). In some embodiments, the counts are updated incrementally for each observed connection. The counts may be used to determine a set of goodness-of-fit metrics (e.g. chi-squared statistics) for a connection count in a latest time period. These goodness-of-fit metrics may then be combined using an aggregation function to obtain the connection's anomaly score (e.g. based on an average of the goodness-of-fit metrics). In some embodiments, the counts maintained by the CCF model may be linked in that the counts of similar types of connection may contribute to one another. For example, the connection count between source node u and destination node v may include a fraction of connections from source node u to different destination nodes. As another example, the connection count between source node u and destination node v in the current time period may include some fraction of connections between these two nodes in previous time periods. In some embodiments, the IMF model and the CCF model may be used together in the cyberattack detection system. The two models are designed to monitor for different signals of lateral movement, and the combination of the two provides better coverage when monitoring for potential lateral movements.

At operation 960, a set of connection paths (e.g. connection path 510 of FIG. 5) are generated from the connection stream. Each connection path may be an acyclic sequence of time-ordered connections in the stream, and generated according to a set of path generation constraints (e.g. limits on the path length, path time duration, etc.). In some embodiments, the connection paths may be generated periodically to include all possible paths satisfying the path generation constraints for connections observed during a most recent observation period.

At operation 970, the generated connection paths are evaluated to identify suspected lateral movement paths in the network. The evaluation may be performed using an embodiment of the connection path evaluator 160 of FIG. 1, and based on a set of lateral movement detection rules (e.g. detection rules 530 of FIG. 5). In some embodiments, the detection of suspicious lateral movement is based on the model-generated anomaly scores for individual connections within the path. In some embodiments, the lateral movement detection rules may specify detection thresholds based on quantiles of the anomaly scores. In some embodiment, the detection rules may be configurable, either manually or programmatically. In some embodiments, instead of relying on explicit rules, the connection path evaluator may be implemented using one or more machine learning models, which may be trained to identify suspicious lateral movement based on the path's connection anomaly scores and other observed features.

At operation 980, the suspected lateral movement path(s) are output as one or more alerts. In some embodiments, the output may be provided via an alert reporting interface (e.g. alert reporting interface 170 of FIG. 1), which may be a graphical user interface or a notification interface that broadcasts alert notifications to registered user accounts of network administrators. In some embodiments, the output may indicate the anomaly scores of each connection in the paths, and one or more lateral movement detection rules that were triggered by the path, as shown in the GUI 800 in FIG. 8. The generated alerts may be reviewed by network administrators and security analysts to determine if the reported path is truly an instance of lateral movement in a cyberattack.

Figure 10:
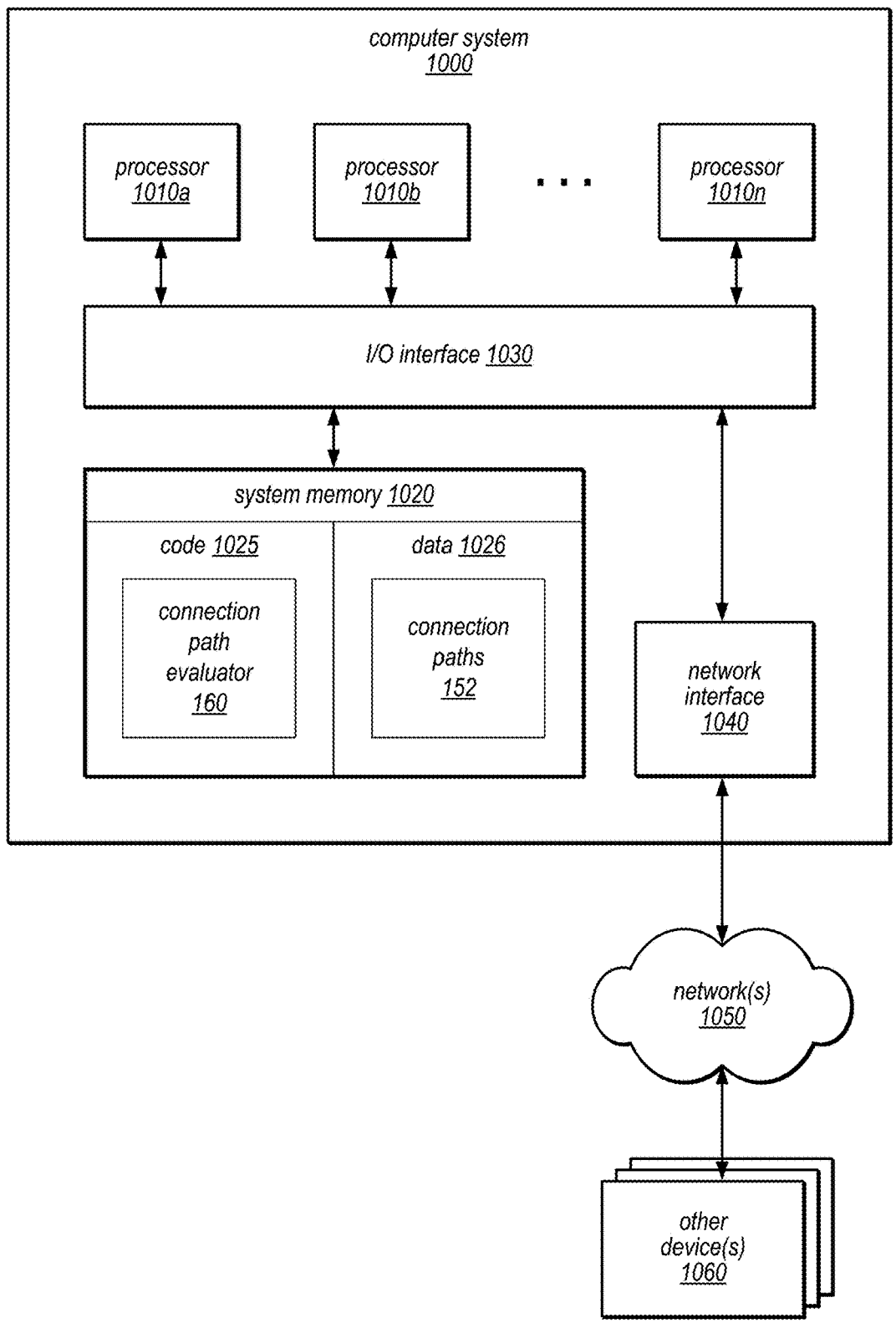
FIG. 10 is a block diagram illustrating an example computer system that can be used to implement one or more portions of a cyberattack detection system that uses multiple online anomaly scoring models to detect suspected lateral movements in a computer network, according to some embodiments.

FIG. 10 is a block diagram illustrating an example computer system that can be used to implement one or more portions of a cyberattack detection system that uses multiple online anomaly scoring models to detect suspected lateral movements in a computer network, according to some embodiments. For example, the computer system 1000 may be a server that implements one or more components of the cyberattack detection system 100 of FIG. 1 or the network monitoring service 230 of FIG. 2.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the connection path evaluator 160, as discussed. The system memory 1020 may also be used to store data 1026 needed or produced by the executable instructions. For example, the in-memory data 1026 may be used to store the connection paths 152, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
   one or more hardware processors with associated memory that implement a cyberattack detection system, configured to:
   receive a stream of connections observed among nodes of a computer network;
   for individual connections in the stream:
      determine a first anomaly score for the connection using a first machine learning model, wherein the first machine learning model is an incremental matrix factorization model;
      update the first machine learning model based on the connection using a first online machine learning technique,
      determine a second anomaly score for the connection using a second machine learning model of a different type from the first machine learning model, wherein the second machine learning model is a connection count fitting model, and
      update the second machine learning model based on the connection using a second online machine learning technique;
   generate a plurality of connection paths, wherein each connection path includes an acyclic sequence of time-ordered connections in the stream;
   identify one or more suspected lateral movement paths in the connection paths based on the first and second anomaly scores of the connections in the connection paths; and
   output an alert indicating the one or more suspected lateral movement paths.

2. The system of claim 1, wherein
   the incremental matrix factorization model maintains two factor matrices of a likelihood matrix that indicates respective likelihoods of individual source nodes connecting to individual destination nodes in the computer network;
   to determine the first anomaly score for the connection, the cyberattack detection system is configured to determine a likelihood metric of a source node of the connection connecting to a destination node of the connection based on the two factor matrices; and
   to update the first machine learning model using the first online machine learning technique, the cyberattack detection system is configured to perform an incremental update of the two factor matrices using stochastic gradient descent.

3. The system of claim 2, wherein
   to determine the first anomaly score for the connection, the cyberattack detection system is configured to:
   reduce the first anomaly score of the connection using a penalty function, wherein the reduction is based on an amount of observation history of the source node as a connection source.

4. The system of claim 1, wherein
   the connection count fitting model maintains approximate count structures to store approximate counts of:
      (a) connections having same pairs of source and destination nodes in a plurality of time periods, and
      (b) connections having the same pairs of source and destination nodes in a current time period,
   to determine the second anomaly score for the connection, the cyberattack detection system is configured to determine, using the approximate count structures, a goodness-of-fit metric for an approximate count of connections having source and destination nodes of the connection in the current time period, and
   to update the second machine learning model using the second online machine learning technique, the cyberattack detection system is configured to update the approximate count of connections having the source and destination nodes of the connection in the current time period.

5. The system of claim 4, wherein
   to update the second machine learning model, the cyberattack detection system is configured to:
   include, in the approximate count of connections:
      (a) a fraction of previous connections from one or more previous time periods having the same source and destination nodes as the connection, and
      (b) a fraction of other connections in the current time period having the same source node as the connection but a different destination node.

6. The system of claim 4, wherein
   to determine the second anomaly score for the connection, the cyberattack detection system is configured to:
   determine a first chi-squared statistic as the goodness-of-fit metric;

determine a second chi-squared statistic for approximate counts of connections having the same source node as the connection in the current time period;

determine a third chi-squared statistic for approximate counts of connections having the same destination node as the connection in the current time period; and determine the second anomaly score based on an average of the three chi-squared statistics.

7. The system of claim 1, wherein to identify a connection path as a suspected lateral movement path, the cyberattack detection system is configured to:

evaluate the connection path according to one or more evaluation rules, including an evaluation rule that checks whether a threshold number of connections in the connection path have an anomaly score in a specified quantile of the anomaly score.

8. The system of claim 7, wherein the cyberattack detection system implements a configuration interface to modify the evaluation rules.

9. The system of claim 1, wherein to identify a connection path as a suspected lateral movement path, the cyberattack detection system is configured to:

evaluate the first and second anomaly scores of connections in the connection path using one or more machine learning classification models.

10. The system of claim 1, wherein the cyberattack detection system is configured to filter the stream of connections based on connection protocols used by the connections.

11. The system of claim 1, wherein the cyberattack detection system is implemented by a platform-as-a-service (PaaS) provider network, and configured to:

collect connection data from a plurality of client networks; and generate alerts indicating suspected lateral movement paths detected in a client network based on the first and second machine learning models.

12. The system of claim 11, wherein the cyberattack detection system is configured to:

monitor the collected connection data for a drift condition in connection behavior in the client network; and responsive to a detection of the drift condition, automatically adjust one or more parameters for identifying suspected lateral movement paths in the client network.

13. A method, comprising:

performing, by one or more computers that implement a cyberattack detection system:

receiving a stream of connections observed among nodes of a computer network;

for individual connections in the stream:
 determining a first anomaly score for the connection using a first machine learning model, wherein
  the first machine learning model is an incremental matrix factorization model,
 updating the first machine learning model based on the connection using a first online machine learning technique,
 determining a second anomaly score for the connection using a second machine learning model of a different type from the first machine learning model, wherein
  the second machine learning model is a connection count fitting model,
 updating the second machine learning model based on the connection using a second online machine learning technique;

generating a plurality of connection paths, wherein each connection path includes an acyclic sequence of time-ordered connections in the stream;

identifying one or more suspected lateral movement paths in the connection paths based on the first and second anomaly scores of the connections in the connection paths; and outputting an alert indicating the one or more suspected lateral movement paths.

14. The method of claim 13, wherein the incremental matrix factorization model maintains two factor matrices of a likelihood matrix that indicates respective likelihoods of individual source nodes connecting to individual destination nodes in the computer network, determining the first anomaly score for the connection comprises determining a likelihood metric of a source node of the connection connecting to a destination node of the connection based on the two factor matrices, and updating the first machine learning model using the first online machine learning technique comprises performing an incremental update of the two factor matrices using stochastic gradient descent.

15. The method of claim 14, wherein determining the first anomaly score for the connection comprises:

reducing the first anomaly score of the connection using a penalty function, wherein the reduction is based on an amount of observation history of the source node as a connection source.

16. The method of claim 13, wherein the connection count fitting model maintains approximate count structures to store approximate counts of:
 (a) connections having same pairs of source and destination nodes in a plurality of time periods, and
 (b) connections having the same pairs of source and destination nodes in a current time period, determining the second anomaly score for the connection comprises determining, using the approximate count structures, a goodness-of-fit metric for an approximate count of connections having source and destination nodes of the connection in the current time period, and updating the second machine learning model using the second online machine learning technique comprises updating the approximate count of connections having the source and destination nodes of the connection in the current time period.

17. The method of claim 16, wherein updating the second machine learning model comprises:

including, in the approximate count of connections:
 (a) a fraction of previous connections from one or more previous time periods having the same source and destination nodes as the connection, and
 (b) a fraction of other connections in the current time period having the same source node as the connection but a different destination node.

18. The method of claim 17, wherein determining the second anomaly score for the connection comprises:

determining a first chi-squared statistic as the goodness-of-fit metric;

determining a second chi-squared statistic for approximate counts of connections having the same source node as the connection in the current time period;

determining a third chi-squared statistic for approximate counts of connections having the same destination node as the connection in the current time period; and determining the second anomaly score based on an average of the three chi-squared statistics.

19. One or more non-transitory computer-accessible storage media storing program instructions that when executed on or across one or more processors implement at least a portion of a cyberattack detection system and cause the cyberattack detection system to:

receive a stream of connections observed among nodes of a computer network;

for individual connections in the stream:

determine a first anomaly score for the connection using a first machine learning model, wherein the first machine learning model is an incremental matrix factorization model, update the first machine learning model based on the connection using a first online machine learning technique, determine a second anomaly score for the connection using a second machine learning model of a different type from the first machine learning model, wherein the second machine learning model is a connection count fitting model, and update the second machine learning model based on the connection using a second online machine learning technique;

generate a plurality of connection paths, wherein each connection path includes an acyclic sequence of time-ordered connections among the nodes of the computer network;

identify one or more suspected lateral movement paths in the connection paths based on the first and second anomaly scores of the connections in the connection paths; and output an alert indicating the one or more suspected lateral movement paths.

20. The one or more non-transitory computer-accessible storage media of claim 19, wherein to identify a connection path as a suspected lateral movement path, the program instructions when executed on or across the one or more processors cause the cyberattack detection system to:

evaluate the connection path according to one or more evaluation rules, including an evaluation rule that checks whether a threshold number of connections in the connection path have an anomaly score in a specified quantile of the anomaly score.

* * * * *